(12) United States Patent
Le-Bouedec

(10) Patent No.: US 10,257,468 B2
(45) Date of Patent: Apr. 9, 2019

(54) SYSTEMS AND METHODS ALLOWING SAVING, ON A STORAGE DEVICE, UNDER CONTROL OF A PERSONAL ELECTRONIC DEVICE OF A PASSENGER OF A VEHICLE, OF IMAGE DATA OF A VIDEO STREAM ARISING FROM A CAMERA OF THE VEHICLE

(71) Applicant: Airbus Operations (S.A.S.), Toulouse (FR)

(72) Inventor: Erwan Le-Bouedec, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 250 days.

(21) Appl. No.: 14/948,064

(22) Filed: Nov. 20, 2015

(65) Prior Publication Data

US 2016/0156878 A1 Jun. 2, 2016

(30) Foreign Application Priority Data

Dec. 2, 2014 (FR) ..................................... 14 61811

(51) Int. Cl.
*H04N 7/18* (2006.01)
*H04L 29/06* (2006.01)
*H04N 5/232* (2006.01)
*H04N 5/76* (2006.01)
*H04H 20/62* (2008.01)

(52) U.S. Cl.
CPC ............ *H04N 7/181* (2013.01); *H04H 20/62* (2013.01); *H04L 67/42* (2013.01); *H04N 5/23206* (2013.01); *H04N 5/7605* (2013.01)

(58) Field of Classification Search
CPC ........ H04N 5/7605; H04N 7/181; H04N 7/18; H04N 21/2146; H04N 21/43615; H04L 67/42

See application file for complete search history.

(56) References Cited

U.S. PATENT DOCUMENTS 9,749,662 B2 * 8/2017 Easterling .......... H04N 21/2146
2005/0278753 A1 * 12/2005 Brady, Jr. .......... G06F 17/30861
725/76

(Continued)

OTHER PUBLICATIONS

French Search Report for Application No. 14 61811 dated Jul. 24, 2015.

*Primary Examiner* — Behrooz M Senfi
(74) *Attorney, Agent, or Firm* — Jenkins, Wilson, Taylor & Hunt, P.A.

(57) ABSTRACT

Systems and methods are disclosed allowing a passenger of a vehicle to use a personal electronic device to control a saving, on a storage device, of image data of video streams arising from cameras of the vehicle. The system includes at least one client/server module configured to receive and retransmit image data of a video stream received from one of the cameras to the storage device. The client/server module includes a processor configured to connect the personal electronic device to the client/server module, a receiver for receiving a request, originating from the personal electronic device, including an item representative of a set of images of the video stream to be saved and a transmitter for transmitting to the storage device image data of the video stream corresponding to the item, with a view to their saving.

10 Claims, 6 Drawing Sheets

(56) References Cited

U.S. PATENT DOCUMENTS

| | | |
|---|---|---|
| 2006/0028398 A1 | 2/2006 | Willmore |
| 2006/0288377 A1* | 12/2006 | Hsieh ..................... H04N 5/765 |
| | | 725/76 |
| 2007/0199076 A1* | 8/2007 | Rensin .............. H04L 29/06027 |
| | | 726/27 |
| 2009/0096857 A1* | 4/2009 | Frisco ................ H04B 7/18508 |
| | | 348/14.02 |
| 2014/0282727 A1* | 9/2014 | Keen .................. H04N 21/4222 |
| | | 725/37 |
| 2015/0036807 A1* | 2/2015 | Jai ..................... H04M 3/42221 |
| | | 379/88.17 |

* cited by examiner

SYSTEMS AND METHODS ALLOWING SAVING, ON A STORAGE DEVICE, UNDER CONTROL OF A PERSONAL ELECTRONIC DEVICE OF A PASSENGER OF A VEHICLE, OF IMAGE DATA OF A VIDEO STREAM ARISING FROM A CAMERA OF THE VEHICLE

CROSS-REFERENCE TO RELATED APPLICATION

This application claims the benefit of and priority to French patent application No. 14 61811 filed on Dec. 2, 2014, the entire disclosure of which is incorporated by reference herein.

TECHNICAL FIELD

The present disclosure relates to systems and methods allowing saving, on a storage device, under control of a personal electronic device of a passenger of a vehicle, of image data of a video stream arising from a camera of the vehicle and of methods using the system.

BACKGROUND

A journey possibly being lengthy, many passenger transport vehicles, such as aircraft, ships or buses, are equipped with means or systems making it possible to entertain the passengers during the journey.

Thus, vehicles comprising onboard entertainment devices (OBED) are known. In the case of aircraft, these OBEDs are called in-flight entertainment devices (IFED or "In-Flight Entertainment System (IFE)"). These OBEDs make it possible to entertain the passengers of the vehicle during the journey, for example by displaying information messages to them on a screen, by allowing them to choose movies from a database of movies or else by affording them access to games. Certain vehicles are equipped, moreover, with cameras making it possible to acquire video streams comprising images representing the exterior of the vehicle. The images of a video stream acquired by a camera of a vehicle are referred to herein as "exterior images". U.S. patent application US2005/0278753 proposes an IFED allowing the passengers to view the exterior images on a screen.

It is commonplace to see passengers film the screen displaying the exterior images from a personal electronic device such as a mobile telephone, an intelligent telephone (or "smart phone"), a tablet, a photographic apparatus, a camera or else a laptop computer. An objective of these passengers is then to preserve a souvenir of their journey. However, filming a screen does not generally make it possible to obtain images of good quality. Indeed, movements of the vehicle may prevent the personal electronic device from being stabilized, thus preventing correct acquisition of images. Moreover, when an image displayed on a screen is filmed, a degradation due to display on the screen is aggregated with a degradation due to acquisition by the personal electronic device.

It is desirable to alleviate these various drawbacks of the prior art.

In a general manner, it is desirable to provide the passengers of a vehicle with a system allowing these passengers to save exterior images of good quality on their personal electronic device.

SUMMARY

According to a first aspect of the present disclosure, the present disclosure relates to a system allowing saving, on a storage device, under control of a personal electronic device of a passenger of a vehicle, of image data of a video stream arising from a camera of the vehicle, the system comprising an entertainment device onboard the vehicle configured to receive the video stream during a cruising phase. The system comprises: a first client/server module configured to receive and retransmit image data of the video stream received by the entertainment device to the storage device, the first client/server module comprising: a processor configured to connect the personal electronic device to the first client/server module; a receiver for receiving a request, originating from the personal electronic device, the request comprising an item, the so-called (or designated) save item, representative of a set of images of the video stream to be saved; a transmitter for transmitting to the storage device image data of the video stream corresponding to the save item, with a view to a saving of the image data.

This system therefore makes it possible to save image data originating directly from a video stream arising from a camera of the vehicle, thereby making it possible to minimize possible degradations.

According to a particular embodiment, the vehicle is an aircraft.

According to a particular embodiment, the transmitter furthermore makes it possible to transmit the image data of the video stream corresponding to the save item to the personal electronic device with a view to a display by the personal electronic device of images corresponding to the image data.

In this manner the passenger possessing the personal electronic device can view image data corresponding to his request.

According to a particular embodiment, the storage device is included in the personal electronic device or connected to the first client/server module.

In this manner, the image data can be stored on the personal electronic device or on a storage device independent of the personal electronic device.

According to a particular embodiment, when the storage device is connected to the first client/server module, the transmitter furthermore makes it possible to transmit to the personal electronic device an item representative of a save address from which the personal electronic device can download the image data corresponding to the save item.

The passenger possessing the personal electronic device can thus download the image data stored on the storage device when he so desires.

According to a particular embodiment, the first client/server module is included in the entertainment device.

According to a particular embodiment, the first client/server module furthermore makes it possible to broadcast the video stream in real time on a display device during the cruising phase.

Thus, when the vehicle does not comprise any screen, the images corresponding to the video stream can be viewed on the personal electronic device of a passenger.

According to a particular embodiment, the first client/server module is a geographically fixed device, configured to communicate with a second client/server module, included in the entertainment device, during a cruising phase of the vehicle or during a stopping phase of the vehicle, the second client/server module allowing the entertainment device to receive the video stream and to retransmit the video stream to the first client/server module.

According to a particular embodiment, the second client/server module makes it possible to broadcast the video stream in real time on a display device during the cruising phase.

According to one embodiment, the save item comprises, furthermore, an item making it possible to identify the camera that acquired the video stream from among a plurality of cameras of the vehicle and/or an item representative of metadata to be associated with the set of images and/or an item representative of a desired image size and/or an item representative of a desired image coding format and/or an item representative of a desired image compression rate and/or an item representative of at least one period, the so-called (or designated) recording period, of the video stream to be recorded and/or an item representative of a number of images to be saved per second and/or an item representative of at least one type of image from among images of INTRA and/or INTER and/or Bidirectional type and/or key images corresponding to a change of scene in the video stream.

According to a second aspect of the present disclosure, the present disclosure relates to a method of saving, on the basis of a system according to the first aspect, image data of a video stream on a storage device, under control of a personal electronic device of a passenger of a vehicle, the video stream arising from a camera of the vehicle. The method comprises a loading procedure comprising the following steps implemented by the personal electronic device: transmitting a connection request to the first client/server module; dispatching a request to the first client/server module comprising an item, the so-called (or designated) save item, representative of a set of images of the video stream to be saved so as to cause a save of the image data of the video stream corresponding to the save item on the storage device.

According to a particular embodiment, the loading procedure is implemented in the course of a cruising phase of the vehicle.

According to a particular embodiment, the loading procedure is implemented in the course of a stopping phase of the vehicle.

According to a particular embodiment, during the loading procedure, the image data corresponding to the save item are transmitted to the personal electronic device, by the first client/server module, immediately upon receipt of the image data by the first client/server module or after prior storage of the image data on the storage device.

According to a particular embodiment, the step of transmitting a connection request by the personal electronic device to the first client/server module comprises a step of authenticating the passenger.

According to a third aspect of the present disclosure, the present disclosure relates to a method of saving, on the basis of a system according to the first aspect, image data of a video stream on a storage device, under control of a personal electronic device of a passenger of a vehicle, the video stream arising from a camera of the vehicle. The method comprises a transfer procedure comprising the following steps implemented by the first client/server module: receiving a connection request from the personal electronic device; receiving a request comprising an item, the so-called (or designated) save item, representative of a set of images of the video stream to be saved; transmitting image data of the video stream corresponding to the save item to the storage device with a view to a saving of the image data.

According to a particular embodiment, subsequent to the receipt of the request, the first client/server module analyzes the save item and applies a processing to the video stream so as to provide image data compatible with the save item.

According to a particular embodiment, the first client/server module authorizes connection exclusively during a cruising phase of the vehicle or exclusively during a stopping phase of the vehicle.

According to a particular embodiment, when the first client/server module is a geographically fixed device, the second client/server module transmits the video stream to the first client/server module during a cruising phase of the vehicle or during a stopping phase of the vehicle.

According to a fourth aspect of the present disclosure, the present disclosure relates to a computer program product comprising instructions for implementing, by a device, the method according to the second or the third aspect by a processor of the device.

According to a fifth aspect of the present disclosure, the present disclosure relates to storage for storing a computer program comprising instructions for implementing, by a device, the method according to the second or the third aspect when the program is executed by a processor of the device.

BRIEF DESCRIPTION OF THE DRAWINGS

The above-mentioned characteristics of the present disclosure, as well as others, will become more clearly apparent on reading the following description of an exemplary embodiment, the description being given in relation to the attached drawings, among which.

DETAILED DESCRIPTION

The description provided hereinafter endeavors to describe various embodiments of the present disclosure in a context of a passenger transport aircraft comprising an in-flight entertainment device (IFED). The principles of the present disclosure apply however in a wider context. The principles of the present disclosure are indeed applicable to any vehicle comprising an OBED or a client/server device able to implement the present disclosure or to contribute to the implementation of the present disclosure.

Figure 1A:
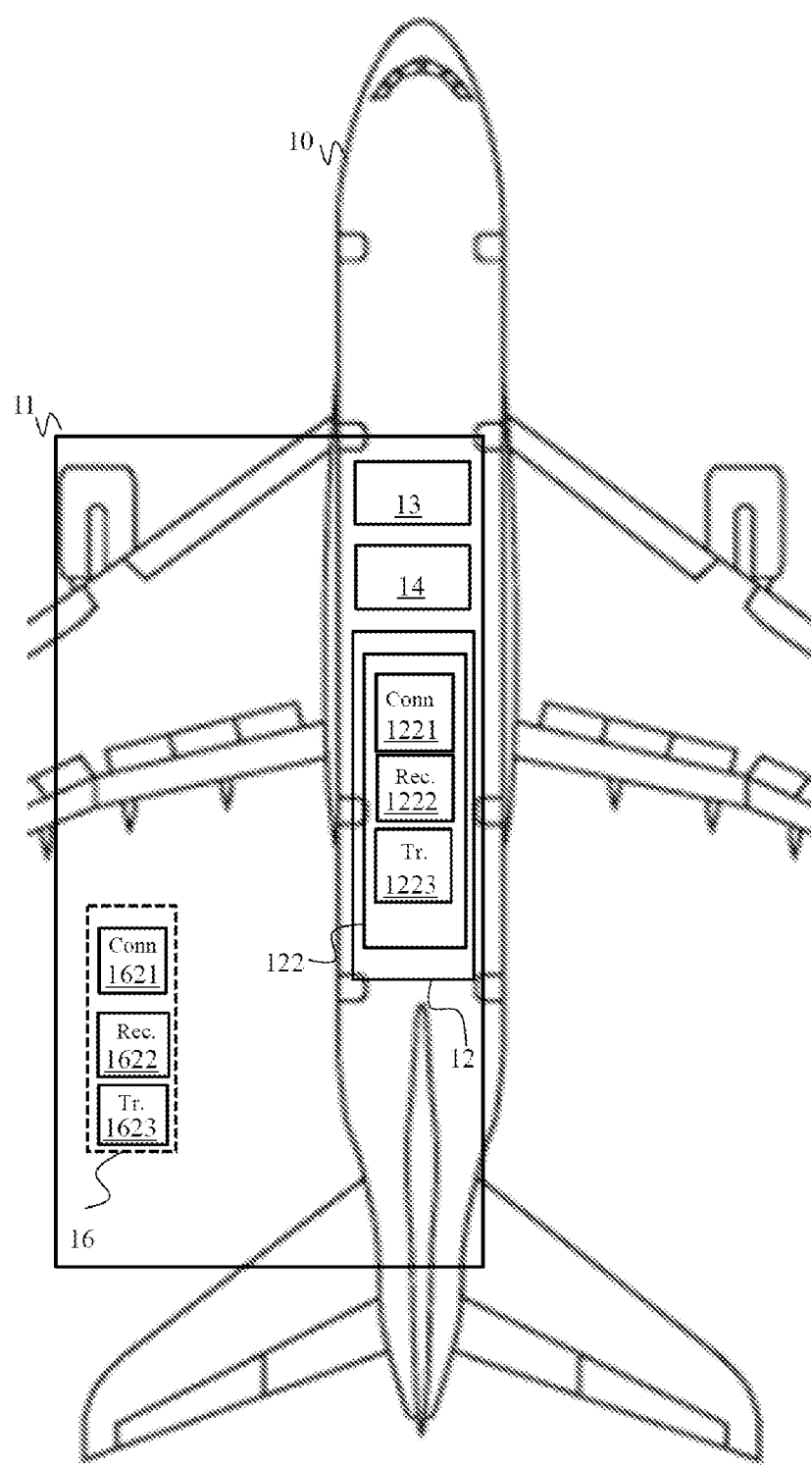
FIG. 1A schematically illustrates an exemplary vehicle comprising a system allowing saving of exterior images on a storage device, under control of a personal electronic device of a passenger.

FIG. 1A schematically illustrates an example of an aircraft 10 comprising a system 11 allowing saving of exterior images on a saving device under control of a personal electronic device of a passenger. It is subsequently assumed that this aircraft 10 operates schematically according to two phases: a first phase, the so-called "cruising phase", during which the aircraft 10 is in flight and transports passengers from a departure point to a destination point; a second phase, the so-called (or designated) "stopping phase", during which the aircraft 10 has landed and is in a stopping position on the ground.

In this example, the system 11 makes it possible to save, on a storage device included in a personal electronic device not represented or connected to the personal electronic device by a network, image data of a video stream arising from a camera 14 of the aircraft 10. The system 11 comprises an IFED 12, onboard the aircraft 10, that is described subsequently in relation to FIG. 2. The IFED 12 is configured to receive the video stream arising from the camera 14 and to broadcast the video stream in real time on a display device 13 of the aircraft 10 during a cruising phase. Moreover, the system 11 comprises a first client/server module 122. In the example of FIG. 1A, the first client/server module 122 is included in the IFED 12. The first client/server module 122 is configured to receive image data of the video stream and to retransmit image data received to a personal electronic device. The first client/server module 122 possesses a processor 1221 configured to allow a personal electronic device to connect to the first client/server module 122. Moreover, the first client/server module 122 possesses a receiver 1222 making it possible to receive requests originating from personal electronic devices. Each request comprises an item, the so-called (or designated) save item, representative of a set of images of the video stream to be saved on the storage device. Moreover, the first client/server module 122 possesses a transmitter 1223 allowing it to transmit to the storage device image data of the video stream corresponding to the save item contained in each request transmitted by a personal electronic device. In this manner, each personal electronic device can save image data corresponding to its request locally, if the storage device is included in the personal electronic device, or remotely, if the storage device is remote.

In a particular embodiment, the first client/server module is not included in the IFED 12 but is a geographically fixed client/server module 16. In this embodiment, the first client/server module 16 is configured to receive image data of the video stream through the intermediary of a second client/server module 122 included in the IFED 12 and to retransmit image data corresponding to a request emanating from a personal electronic device to a storage device, either through the intermediary of the second client/server module, or directly. In this particular embodiment, the client/server module possesses a processor 1621, a receiver 1622 and a transmitter 1623 identical respectively to the processor 1221, to the receiver 1222 and to the transmitter 1223.

In a particular embodiment, the aircraft 10 does not comprise any display devices integrated into the aircraft 10. In this particular embodiment, the personal electronic devices of the passengers of the aircraft 10 are the only devices furnished with displays available in the aircraft 10. In addition to its capabilities for saving image data corresponding to a request, each personal electronic device can, if the passenger so desires, be used to receive and display in real time the video stream arising from the camera 14 or image data of the video stream corresponding to a request of the personal electronic device.

Figure 1B:
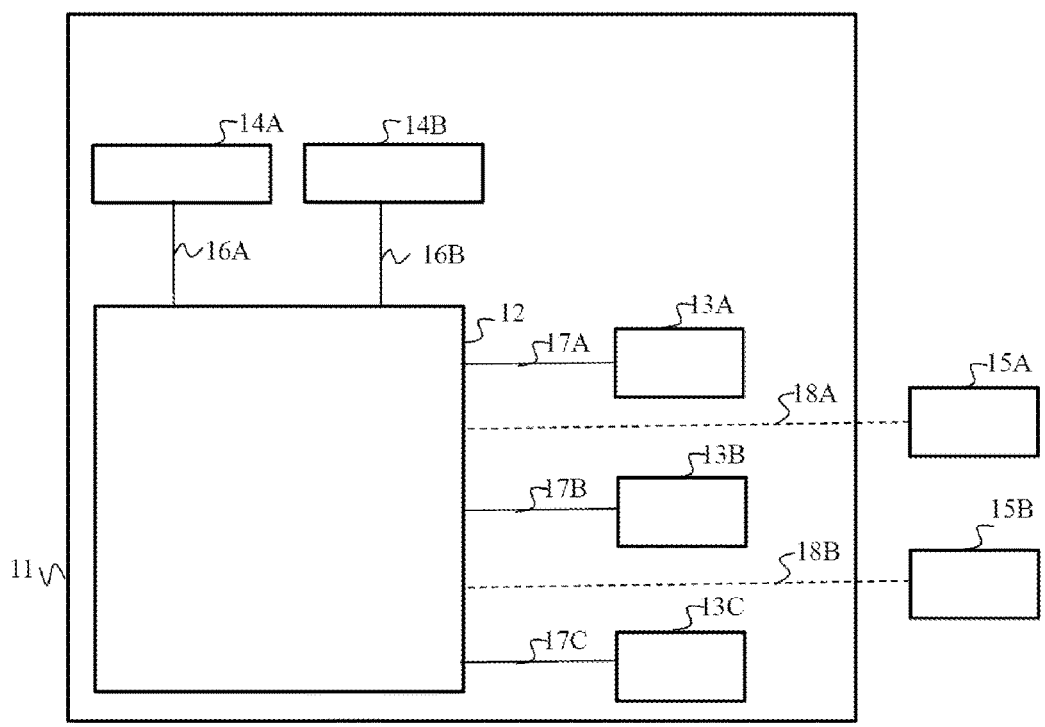
FIG. 1B schematically illustrates a first exemplary system allowing saving of exterior images on a storage device, under control of a personal electronic device of a passenger, the system being entirely included in the vehicle.
Figure 1C:
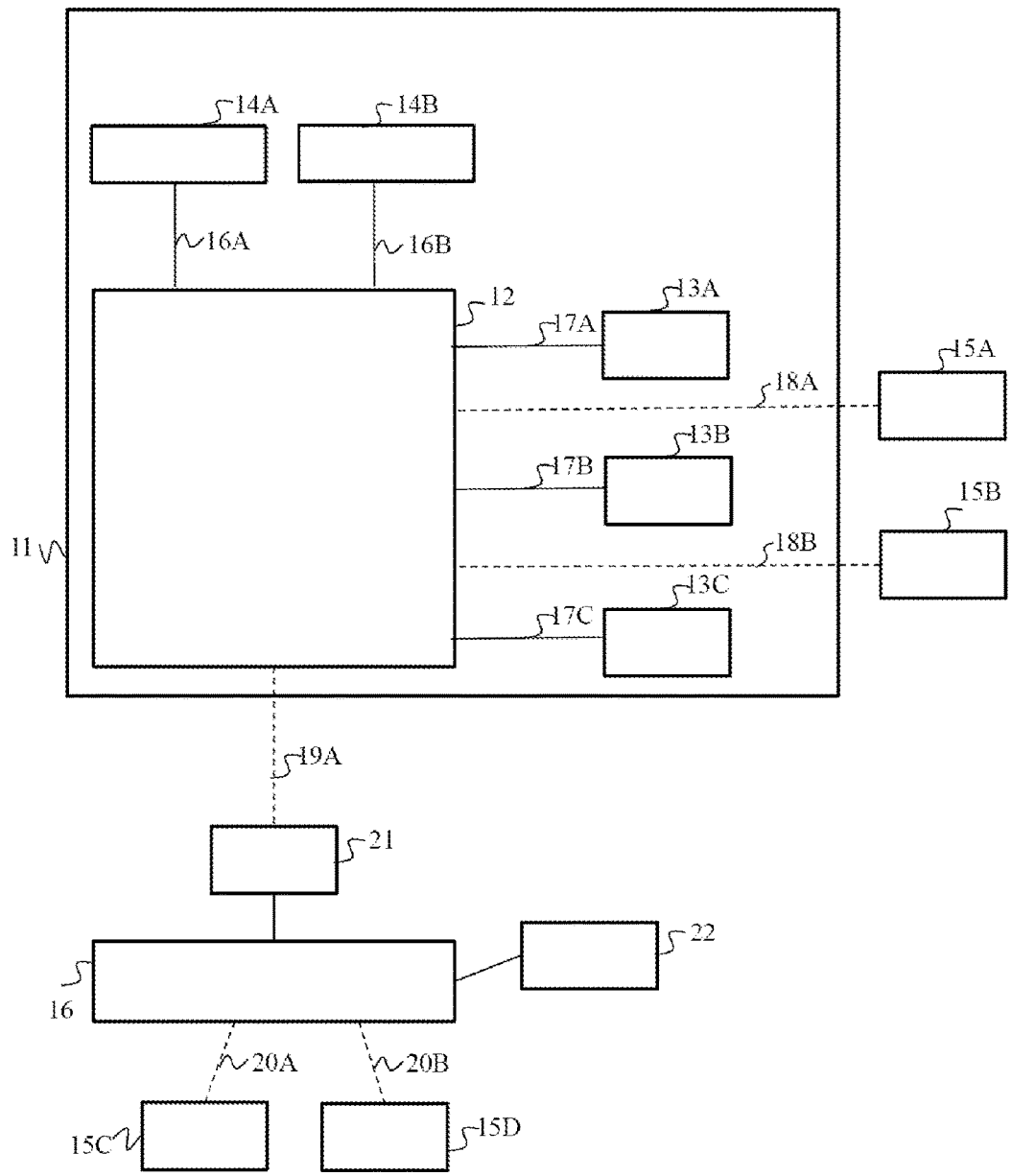
FIG. 1C schematically illustrates a second exemplary system allowing saving of exterior images on a storage device, under control of a personal electronic device of a passenger, a part of the system being included in the vehicle, another part of the system being geographically fixed.

Two detailed examples of implementation of a system 11 in relation to FIGS. 1B and 1C are described subsequently. References of FIG. 1A are re-used to represent identical devices or modules in FIGS. 1B and 1C.

FIG. 1B schematically illustrates a first exemplary system 11 allowing saving of exterior images on a saving device under control of a personal electronic device of a passenger, the system being entirely included in the aircraft 10. The system 11 comprises an IFED 12 able to entertain the passengers of the aircraft during the cruising phase. Among diverse entertainment functionalities offered by the IFED 12, the IFED 12 makes it possible to broadcast in real time on screens 13A, 13B and 13C situated in front of passengers of the aircraft, exterior images arising from cameras 14A and 14B. The cameras 14A and 14B and the screens 13A, 13B and 13C are respectively connected with the IFED 12 by network links such as, for example, Ethernet wired network links. Personal electronic devices 15A and 15B, external to the system 11 and belonging to passengers, can be temporarily connected to the IFED 12 according to methods that are described in relation to FIGS. 5 and 6. The personal electronic devices 15A and 15B, when they are connected, respectively use network connections 18A and 18B. The network connections 18A and 18B can be, for example, wireless connections such as Wi-Fi connections using protocols of IEEE802.11 (ISO/CEI 8802-11) type. The connections 18A and 18B can also be wired connections such as for example USB ("Universal Serial Bus") connections. In the latter case, the aircraft comprises seats or screens furnished with USB connectors into which the personal electronic devices of the passengers can be plugged.

In one embodiment, the aircraft 10 does not comprise any screen. The IFED 12 does not then have the possibility of broadcasting in real time on screens of the aircraft, images arising from the cameras 14A and 14B. In this embodiment, the IFED 12 is configured to retransmit the video streams arising from the cameras 14A and 14B to the personal electronic devices of the passengers so that the latter display the video streams, and is configured to allow the personal electronic devices to save all or part of the video streams, each saving being able to be local on a personal or remote electronic device on a storage device remote from the personal electronic device.

Figure 2:
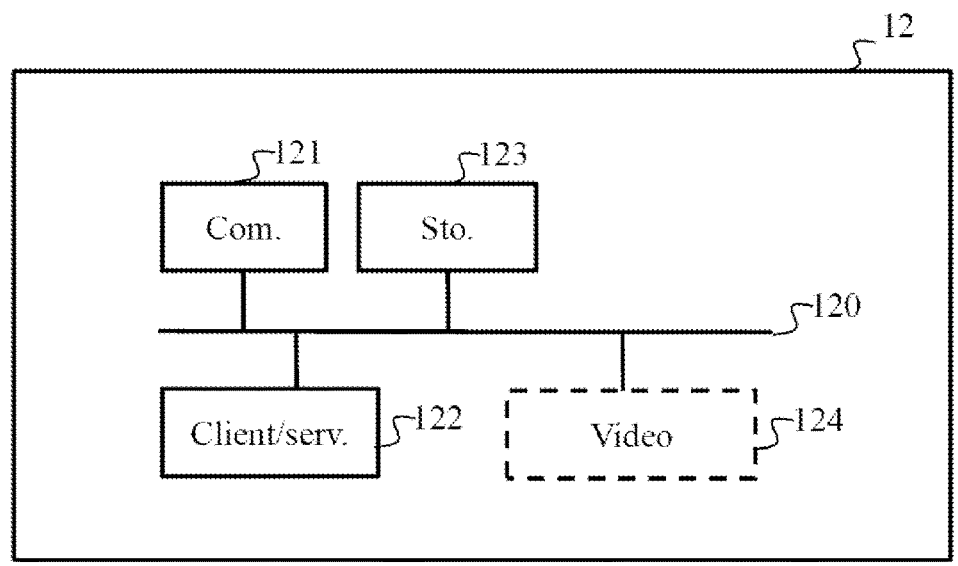
FIG. 2 schematically illustrates an exemplary onboard entertainment device (OBED) able to implement a method making it possible to save exterior images on a storage device under control of a personal electronic device.

FIG. 2 schematically illustrates an exemplary IFED 12 configured to implement a method making it possible to save exterior images on a storage device under control of a personal electronic device.

The IFED 12 comprises, linked by a communication bus 120, a communication device 121, a client/server module 122 and a storage device 123.

The communication device 121 is configured to receive video streams from the cameras 14A and 14B and to retransmit these video streams to the screens 13A, 13B and 13C through the intermediary of the client/server module 122.

The communication device 121 is, moreover, configured to receive a request originating from a personal electronic device (15A or 15B), the request comprising a save item representative of a set of images of the video stream to be saved, and to transmit image data of a video stream corresponding to the save item to a storage device included in the personal electronic device that sent the request or connected to the personal electronic device that sent the request. Each request received by the communication device 121 is transmitted, through the intermediary of the communication bus 120, to the client/server module 122 which processes them.

Moreover, the communication device 121 is configured to receive a connection request originating from a personal electronic device (15A or 15B) and to transmit a connection authorization to the personal electronic device (15A or 15B). Each connection request is transmitted, through the intermediary of the communication bus 120, to the client/server module 122 which processes them.

The client/server module 122 is configured to receive each video stream produced by the cameras 14A and 14B and, on the one hand, to redirect these video streams to the screens 13A, 13B and 13C with a view to real-time display and, on the other hand, to retransmit image data of the video stream to the storage device 123 with a view to their storage.

Moreover, the client/server module 122 is configured to receive a request transmitted by the communication device 121 and to analyze a save item contained in the request.

The save item gives characteristics of the image data of the video stream to be saved. The save item comprises, for example, a temporal item indicating a period of the video stream, the so-called (or designated) recording period, having to be saved on the personal electronic device that sent the request. A passenger can request a saving of the entirety or a sub-part of a video stream on his personal electronic device. When the aircraft comprises a plurality of cameras, the save item comprises an item making it possible to identify the camera that acquired the video stream. Moreover, the save item can comprise an item representative of a number of images to be saved per second during the recording period and an item representative of metadata to be combined with the image data of the video stream to be saved. The metadata can for example be geolocation data of the aircraft corresponding to the recording period, items describing the geographical areas traversed during the recording period or URL ("Uniform Resource Locator") addresses of web sites making it possible to obtain items describing the geographical areas traversed.

Moreover, the client/server module 122 is configured to analyze image data of a video stream arising from a camera 14A or 14B and to extract from the video stream image data corresponding to a save item received in a request. The analysis and the extraction can be done either directly on the basis of a video stream arising from a camera or on the basis of a video stream stored previously in the storage device 123. When image data have been extracted, the client/server module 122 is configured to transmit the image data to a storage device included in the personal electronic device that sent the request or connected to the personal electronic device through the intermediary of the communication device 121. When the image data are extracted directly from a video stream received from a camera 14A or 14B, the client/server module 122 is configured to retransmit the image data to the storage device immediately upon their receipt by the client/server module 122. When the image data are extracted from a video stream stored on the storage device 123, the client/server module 122 is configured to delay the retransmission of the image data to the storage device.

Moreover, the client/server module 122 is configured to receive from the communication device 121, connection requests emanating from the personal electronic devices 15A and 15B. In response to a connection request, the client/server module 122 is configured to transmit a connection authorization to the personal electronic device that sent the connection request.

In one embodiment, the client/server module 122 is implemented in the form of an HTTP ("Hypertext Transfer Protocol") client/server. From the point of view of the connections between the IFED 12 and the cameras 14A and 14B, the client/server module 122 is an HTTP client configured to transmit HTTP requests to the cameras 14A and 14B to receive video streams. In this embodiment, the cameras 14A and 14B each implement an HTTP server configured to broadcast (or "stream") the video stream acquired by the camera. The broadcasting of the video streams can use for example the HLS broadcasting protocol (real-time broadcasting based on HTTP or "HTTP Live Streaming").

From the point of view of the connections between the IFED 12 and the screens 13A, 13B and 13C, the client/server module 122 is an HTTP server configured to receive HTTP requests emanating from the screens 13A, 13B and 13C and to respond to these requests by broadcasting video streams corresponding to the HTTP requests. In this embodiment, each screen 13A, 13B and 13C implements an HTTP client controlled by a man machine interface integrated into the screen. The screen can for example be a touchscreen allowing a passenger to choose which camera should be displayed. The man machine interface can for example be a web application ("web app"). The broadcasting of the video streams to the screens 13A, 13B and 13C can use, for example, the HLS broadcasting protocol.

From the point of view of the connections between the IFED 12 and the personal electronic devices 15A and 15B, the client/server module 122 is an HTTP server comprising the processor 1221, the receiver 1222 and the transmitter 1223 which are described in relation to FIG. 1A. Indeed, the HTTP server implemented by the client/server module 122 is configured to receive HTTP requests comprising connection requests and to respond to these connection requests by using HTTP requests. Moreover, the client/server module 122 is configured to receive HTTP requests, emanating from the personal electronic devices 15A and 15B, comprising save items and to respond to these requests by transmitting image data of the video streams corresponding to the save item contained in the HTTP requests to a storage device.

It is noted that the use of an HTTP client/server module is not restrictive and that other types of client/server modules can be used, such as for example client/server modules based on the RTP protocol ("Real-time Transport Protocol", RFC 1889) or UDP protocol ("User Datagram Protocol", RFC 768).

In one embodiment, the IFED 12 comprises a video controller module 124. The video controller module 124 is used when characteristics of the video stream received by the client/server module 122 are not compatible with a request of a personal electronic device. In this embodiment, the personal electronic device is configured to specify in its requests, capabilities such as for example, a desired coding format, a desired compression rate, a type of image that it knows how to manage from among images of INTRA and/or INTER and/or Bidirectional type. The personal electronic device is also configured to specify in its request constraints on the image data, such as for example, by specifying that it desires to save only key images corresponding to changes of scene in the video stream. The client/server device 122 is then configured to determine, during an analysis of a save item contained in a request, whether a video stream or image data of a video stream are incompatible with a request. In case of incompatibility, the client/server module 122 is configured to transmit the video stream or the image data of the video stream to the video controller module 124 so that the video controller module 124 applies a processing making it possible to render the video stream or the image data compatible with the request. When it receives a video stream or image data, the video controller module 124 is configured to apply a transcoding to this video stream or to these image data so as, for example, to adapt the size of the images, to change the coding format of the image data, to delete the images having an image type incompatible with the request, to provide only key images or else to reduce the coding bitrate of these image data so as to attain a desired compression rate. The video controller module 124 is configured to provide the client/server module 122 with a video stream or image data of a video stream adapted to a request, the video stream or the image data being retransmitted to the storage device included in the personal electronic device or connected by a network to the personal electronic device.

Figure 3:
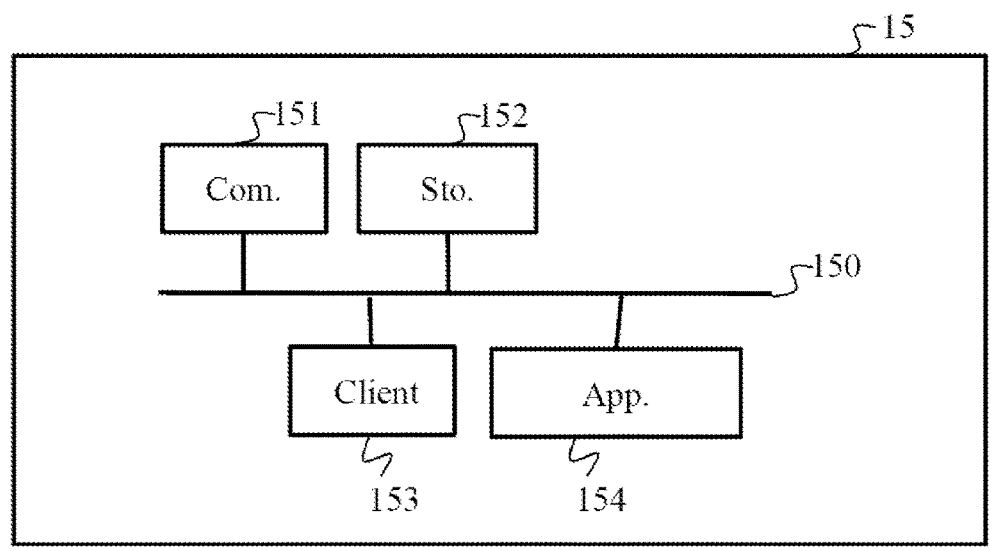
FIG. 3 schematically illustrates an exemplary personal electronic device able to implement a method making it possible to save exterior images on a saving device under control of the personal electronic device.

FIG. 3 schematically illustrates an exemplary personal electronic device 15 configured to implement a method making it possible to save exterior images on a storage device under control of the personal electronic device 15. The electronic device 15 is for example the personal electronic device 15A or the personal electronic device 15B. The personal electronic device 15 comprises, linked by a communication bus 150, a communication device 151, a storage device 152, a client module 153 and an application package module 154. The personal electronic device moreover comprises a display device (not represented), such as a screen and a control device such as a keyboard or buttons (not represented), or a combined display and control device such as a touchscreen (not represented).

The communication device 151 is configured to receive image data of a video stream from the IFED 12 and to retransmit them, if necessary, to the storage device 152 through the intermediary of the client module 153. The communication device 151 is, moreover, configured to transmit requests to the IFED 12 comprising a save item. Moreover, the communication device 151 is configured to transmit connection requests to the IFED 12 and to receive connection authorizations.

The application package module 154 makes it possible to control a saving of image data of a video stream on the storage device 152 or on a remote storage device. The application package module 154 provides a man machine interface, such as a graphical interface displayed on the touchscreen, allowing a passenger using the personal electronic device 15 to define save items.

The client module 153 is configured to receive save items from the application package module 154 and to insert them into requests intended for the IFED 12. Moreover, the client module 153 is configured to transmit a connection request to the IFED 12 through the intermediary of the communication module 151.

Moreover, the client module 153 is configured to receive image data of a video stream corresponding to a save item contained in a request sent by the personal electronic device 15. When image data are received, the client module 153 is configured to store them in the storage device 152 and/or to display them on the display device of the personal electronic device 15.

In this embodiment, when the IFED 12 implements an HTTP server, the client module 153 is implemented in the form of an HTTP client.

In one embodiment, the application package module 154 is a software application (i.e. mobile application). This software application can, for example, be downloaded onto the personal electronic device 15 prior to a passenger's journey. This software application is configured to display, for example on the touchscreen of the personal electronic device 15, a graphical interface composed of various menus allowing the passenger to specify characteristics of the image data of the video stream to be saved. In this embodiment, when the application package module 154 is activated by the passenger, the client module 153 is configured to transmit a connection request to the IFED 12.

Figure 4A:
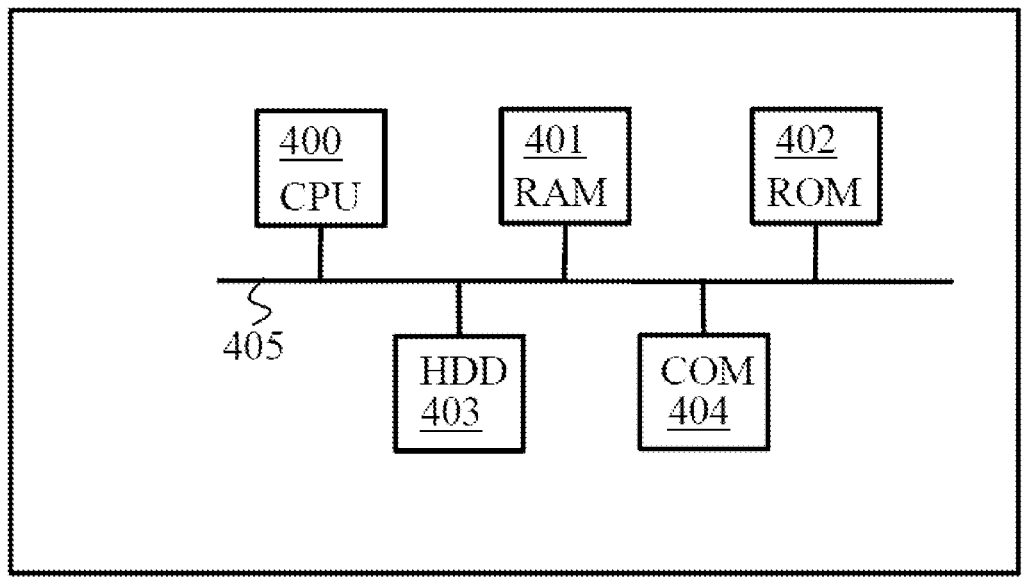
FIG. 4A schematically illustrates a hardware architecture of an OBED able to implement a method making it possible to save exterior images on a saving device under control of the personal electronic device.

FIG. 4A schematically illustrates a hardware architecture of an OBED configured to implement a method making it possible to save exterior images on a saving device under control of the personal electronic device. In FIG. 4A, the example of the IFED 12 is illustrated.

According to the exemplary hardware architecture represented in FIG. 4A, the IFED 12 then comprises, linked by a communication bus 405: a processor or CPU ("Central Processing Unit") 400; a RAM ("Random Access Memory") 401; a ROM ("Read Only Memory") 402; a storage unit such as a hard disk or a storage medium reader, such as an SD ("Secure Digital") card reader 403 corresponding to the storage device 123; at least one communication interface 404 allowing for example the IFED 12 to communicate with the cameras 14A and 14B, the screens 13A, 13B and 13C and the personal electronic devices 15A and 15B. The communication interface 404 corresponds for example to the communication device 121.

The processor 400 is capable of executing instructions loaded into the RAM 401 from the ROM 402, from an external memory (not represented), from a storage medium (such as an SD card), or from a communication network. When the IFED 12 is powered up, the processor 400 is capable of reading instructions from the RAM 401 and of executing them. These instructions form a computer program causing the implementation, by the processor 400, of all or part of the modules, algorithms and steps described in relation to FIGS. 2 and 6, such as for example the client/server module 122.

Figure 4B:
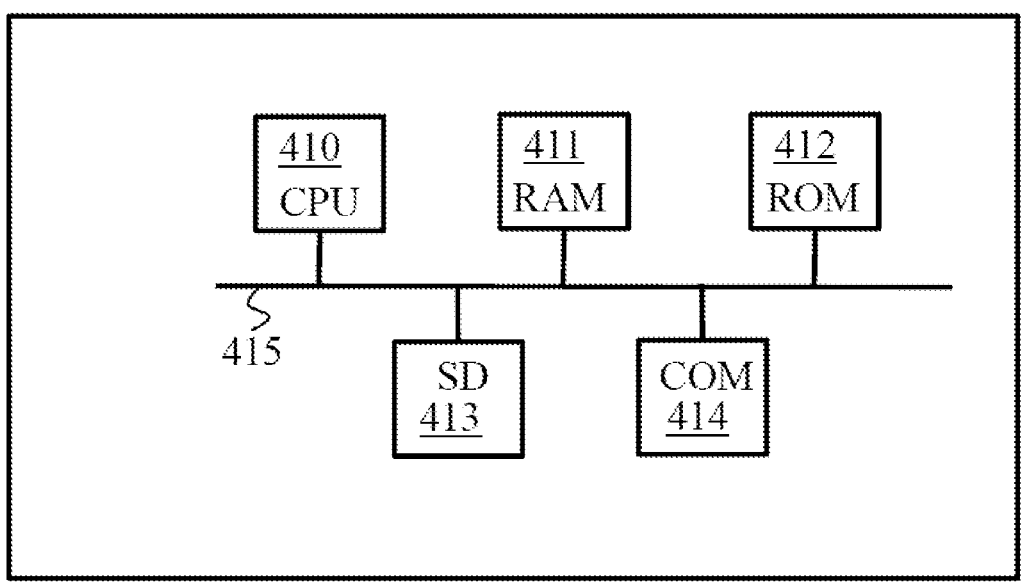
FIG. 4B schematically illustrates a hardware architecture of a personal electronic device able to implement a method making it possible to save exterior images on a saving device under control of the personal electronic device.

FIG. 4B schematically illustrates a personal electronic device hardware architecture configured to implement a method making it possible to save exterior images on a storage device under the control of the personal electronic device. In FIG. 4B, the example of the personal electronic device 15 is illustrated.

According to the exemplary hardware architecture represented in FIG. 4B, the personal electronic device 15 then comprises, linked by a communication bus 415: a processor or CPU ("Central Processing Unit") 410; a RAM ("Random Access Memory") 411; a ROM ("Read Only Memory") 412; a storage unit such as an SD ("Secure Digital") card or a storage medium reader, such as an SD ("Secure Digital") card reader 413, corresponding to the storage device 152; at least one communication interface 414 allowing the personal electronic device 15 to communicate with the IFED 12. The communication interface 414 corresponds for example to the communication device 151.

The processor 410 is capable of executing instructions loaded into the RAM 411 from the ROM 412, from an external memory (not represented), from a storage medium (such as an SD card), or from a communication network. When the personal electronic device 15 is powered up, the processor 410 is capable of reading instructions from the RAM 411 and of executing them. These instructions form a computer program causing the implementation, by the processor 410, of all or part of the modules, algorithms and steps described in relation to FIGS. 3 and 5, such as for example the client module 153.

All or part of the modules, algorithms and steps described in relation to FIGS. 2, 3, 5 and 6 can be implemented in software form by execution of a set of instructions by a programmable machine, for example a DSP ("Digital Signal Processor") or a microcontroller, or be implemented in hardware form by a dedicated machine or component, for example an FPGA ("Field-Programmable Gate Array") or an ASIC ("Application-Specific Integrated Circuit").

Figure 5:
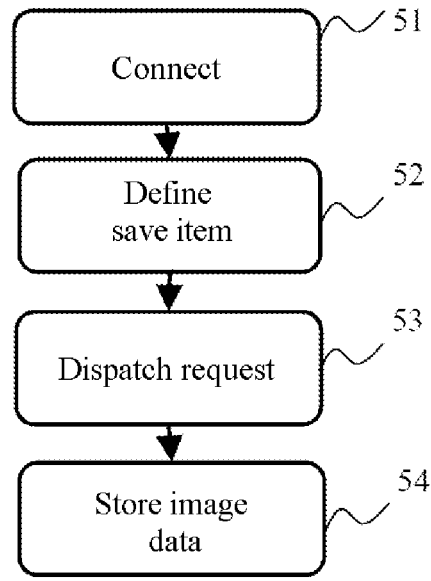
FIG. 5 schematically illustrates an exemplary method making it possible to save exterior images on a saving device under control of a personal electronic device implemented by a personal electronic device; and, FIG. 6 schematically illustrates an exemplary method making it possible to save exterior images on a saving device under control of a personal electronic device implemented by a client/server device.

FIG. 5 schematically illustrates an exemplary loading procedure, making it possible to save exterior images on a storage device under control of the personal electronic device 15, implemented by the personal electronic device 15. In one embodiment, it is assumed that, prior to his or her journey, a passenger has downloaded onto his personal electronic device a software application implementing the application package module 154.

The loading procedure starts subsequent to an activation of the application package module 154 by the passenger. Subsequent to the activation of the application package module 154, the personal electronic device transmits a connection request to the IFED 12, during a step 51. In one embodiment, the IFED 12 systematically authorizes each passenger, wishing to connect to the IFED 12, to connect. Consequently, during step 51, subsequent to the dispatching of the connection request, the personal electronic device receives a connection authorization.

In a step 52, the passenger uses the man machine interface provided by the application package module 154 to define characteristics of the image data of a video stream that they desire to receive. These characteristics are thereafter put into the form of a save item.

In a step 53, the personal electronic device 15 inserts the save item thus obtained into a request and transmits this request to the IFED 12.

In a step 54, the personal electronic device 15 receives image data corresponding to the save item transmitted in the request and saves these image data for example in the storage device 152. These image data are therefore adapted to what the passenger possessing the personal electronic device 15 desires to receive. These image data are obtained directly on the basis of a video stream arising from a camera and do not therefore undergo degradations due to an acquisition on the basis of an image displayed on a screen of the aircraft.

In one embodiment, an authentication procedure is implemented subsequent to the dispatching of the connection request to the IFED 12. During this authentication procedure, the passenger must authenticate himself with the IFED 12 before being authorized to connect. For example, subsequent to the dispatching of the connection request, the man machine interface provided by the application package module 154 can display a request for an identifier and for a password. This identifier and this password may for example have been provided to the passenger when purchasing his ticket or upon arrival in the aircraft.

In a particular embodiment, the passenger has not downloaded onto his personal electronic device a software application implementing the application package module 154 prior to his journey.

In this particular embodiment, the passenger is invited, by displays of items on the screens 13A, 13B or 13C or by panels in the aircraft, to download a software application implementing the application package module 154 from a URL address which is indicated to him. In one embodiment, the URL address indicated is the address of a Web application (such as a Web page) which, when it is interpreted by a web browser integrated into the personal electronic device, makes it possible to implement the application package module 154.

In a particular embodiment of step 54, the image data corresponding to the save item transmitted in the request are not received by the personal electronic device 15. In this embodiment, the personal electronic device 15 receives only an item representative of a save address from which the personal electronic device 15 can download the image data, thereby avoiding overloading the storage device 152 of the personal electronic device 15. The data representative of the save address can be a URL address. This URL address can point to a saving area of a remote storage device on which the image data are saved. In one embodiment, the remote storage device can for example be the storage device 123 of the IFED 12.

In one embodiment of step 54, the image data corresponding to the save item transmitted in the request are received by the personal electronic device 15 just for viewing. The personal electronic device 15 does not save the image data, thereby avoiding overloading the storage device 152 of the personal electronic device 15. In this embodiment, the personal electronic device 15 moreover receives a URL address pointing to a saving area of a remote storage device on which the image data are saved (for example, the storage device 123). This URL address can then be used by the passenger possessing the personal electronic device 15 to download the image data when he so desires.

In one embodiment, the passenger possessing the personal electronic device 15 can specify whether he desires to save the image data on the personal electronic device or on a remote storage device.

Figure 6:
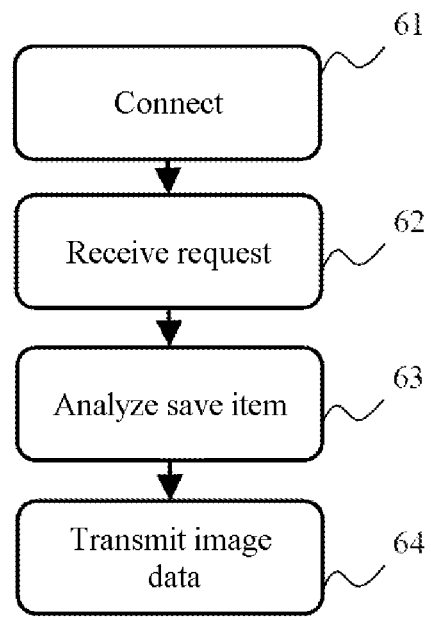

FIG. 6 schematically illustrates an exemplary transfer procedure, making it possible to save exterior images on a saving device under control of the personal electronic device 15, implemented by the client/server module 122 of the IFED 12. This transfer procedure is implemented by the client/server module 122 of the IFED 12 when the personal electronic device 15 implements the loading procedure described in relation to FIG. 5.

The transfer procedure starts with a step 61 of receiving a connection request originating from the personal electronic device 15. As seen above, in one embodiment, the client/server module 122 systematically authorizes each passenger to connect his personal electronic device to the IFED 12. Consequently, as soon as it receives the connection request emanating from the personal electronic device 15, the client/server module 122 dispatches a connection authorization to the personal electronic device 15.

During a step 62, the client/server module 122 receives a request containing a save item.

During a step 63, the client/server module 122 undertakes an analysis of the save item received in the request. When several cameras are available on the aircraft, the client/server module 122 will determine which camera is concerned in the request on the basis of the save item. The client/server module 122 will thereafter identify the video stream stored on the storage device 123 corresponding to the determined camera. When the video stream is identified, this video stream is analyzed to identify first image data corresponding, for example, to a saving period specified in the save item.

If the save item comprises a number of images to be saved per second, the client/server module 122 temporally undersamples the images contained in the first image data so as to obtain second image data comprising a series of images having an image frequency corresponding to the number of images to be saved per second. If, for example, the camera acquires images with an image frequency of "30" images per second and if the save item specifies a number of images per second equal to "10" images per second, the client/server module 122 extracts one image out of three from the first image data to obtain the second image data.

If the save item requires a transmission of metadata relating to the image data, the client/server module 122 obtains these metadata and combines them with the first or the second image data.

In a step 64, the first image data (or second image data if second image data have been calculated), associated or not with metadata, are transmitted to the personal electronic device 15 by the client/server module 122.

As we saw above in relation to FIG. 2, the IFED 12 can comprise a video controller module 124. In this embodiment, the client/server device 122 determines, during the analysis of the save item of step 63, whether the first or second image data are compatible with the save item contained in the request. In case of incompatibility, the client/server module 122 transmits, during step 63, the first or second image data to the video controller module 124 so that it provides third image data compatible with the save item. In this embodiment, it is the third image data which are transmitted to the personal electronic device 15 during step 64.

As seen above, in one embodiment, an authentication procedure is implemented subsequent to the dispatching of the connection request to the IFED 12. In this embodiment, when it receives the connection request, the client/server module 122 dispatches a request to the personal electronic device 15 so as to cause a display, through the intermediary of the man machine interface provided by the application package module 154, of a request for an identifier and for a password. It is only if the client/server module 122 receives a correct identifier and a correct password that the client/server module 122 transmits a connection authorization to the personal electronic device 15.

When the passenger has not downloaded onto the personal electronic device 15 a software application implementing the application package module 154 prior to his journey, the client/server module 122 transmits a software application implementing the application package module 154 to the personal electronic device 15. The software application is transmitted in response to the receipt by the client/server module 122 of a request originating from the personal electronic device 15 containing a URL address corresponding to the software application. In one embodiment, the client/server module 122 can transmit a Web application in response to the request.

In one embodiment, during step 63, the client/server module 122 extracts the image data, corresponding to the save item contained in the request, directly from a video stream that it receives. In this embodiment, the client/server module 122 transmits the image data thus obtained without passing through a prior step of storing the video stream in the storage device 123.

In one embodiment of step 64, the first image data (or second or third image data if second or third image data have been calculated), associated or not with metadata, are saved in the storage device 123 of the IFED 12. In this embodiment, the client/server module 122 transmits a URL address to the personal electronic device 15. The URL address points to the first (or the second or third) image data corresponding to the request of the personal electronic device 15. The passenger possessing the personal electronic device 15 can download the image data from this URL address, at any moment during the cruising phase or during the stopping phase of the vehicle.

In one embodiment of step 64, the first image data (or second or third image data if second or third image data have been calculated), associated or not with metadata, are saved in the storage device 123 of the IFED 12 and transmitted to the personal electronic device 15. Moreover in this embodiment, the client/server module 122 transmits a URL address to the personal electronic device 15. The URL address points to the first (or the second or third) image data corresponding to the request of the personal electronic device 15. When he receives the image data, the passenger possessing the personal electronic device 15 can view the data. However, these image data are not saved on the personal electronic device 15. Moreover, by using the URL address, the passenger possessing the personal electronic device 15 can download the image data at any moment during the cruising phase or the stopping phase of the vehicle.

In one embodiment, the procedures described in relation to FIGS. 5 and 6 can be implemented at any moment during the cruising phase of the aircraft.

In one embodiment, the procedures described in relation to FIGS. 5 and 6 may not be implemented during the aircraft cruising phase but only during the aircraft stopping phase, subsequent to the arrival of the aircraft at its destination.

FIG. 1C schematically illustrates a second exemplary system allowing saving of exterior images on a storage device under control of a personal electronic device of a passenger, a part of the system being included in the vehicle, another part of the system being geographically fixed. The system described in relation to FIG. 1C comprises a system 11 identical to the system 11 described in relation to FIG. 1B configured to receive video streams from cameras 14A and 14B and to retransmit these videos to screens 13A, 13B and 13C. Moreover, the system allowing the saving of exterior images on a storage device under control of a personal electronic device comprises a client/server module 16 situated on the ground in a geographically fixed position. For example, the client/server module 16 can be situated in an airport. The client/server module 16 is, for example, an HTTP client/server module integrated into a computer on the ground. The client/server module 16 is connected to a storage device 22 configured to store video streams and video stream image data selected with the help of personal electronic devices.

In this second example, the IFED 12 is configured to communicate with the client/server module 16, through the intermediary of a communication module 21, by using, for example, a satellite connection 19A. By virtue of the satellite connection 19A, the IFED 12 is configured to transmit each video stream arising from the cameras 14A and 14B to the client/server module 16 which stores them in the storage device 22.

This exemplary system allowing saving of exterior images on a saving device under control of a personal electronic device allows the implementation of the procedures described in relation to FIGS. 5 and 6. Other alternative embodiments are possible however.

In an alternative embodiment, the IFED 12 is merely an intermediary between the personal electronic devices 15A and 15B and the client/server module 16. During the implementation of the transfer procedure described in relation to FIG. 6, the IFED 12 retransmits the connection authorization request received during step 61 and the request received during step 62 to the client/server module 16. In this embodiment, it is the client/server module 16 which responds to the connection authorization request. During step 61, a connection authorization is then transmitted by the client/server module 16 to the personal electronic device that sent the request through the intermediary of the client/server module 122 of the IFED 12. During step 63, it is the client/server module 16 which undertakes the analysis of the save item contained in the request. During step 64, it is the client/server module 16 which transmits image data corresponding to the save item to the storage device included in the personal electronic device that sent the request or connected to the personal electronic device through the intermediary of the client/server module 122 of the IFED 12.

In one embodiment, when the personal electronic device (15A or 15B) receives a URL address pointing to the image data corresponding to the request (with or without the image data for display on the personal electronic device 15A or 15B), it is the client/server module 16 which dispatches this URL address (and the image data if appropriate) to the personal electronic device 15A or 15B. The image data pointed to by the URL address are then stored on the storage device 22 and not on the personal electronic device 15A or 15B, thereby avoiding overloading the storage device 152 of the personal electronic device 15A or 15B. The passenger possessing the personal electronic device 15A or 15B can view the image data at any moment by using the corresponding URL address.

In another alternative embodiment, the IFED 12 does not have the possibility of responding to the connection requests and to the requests of the personal electronic devices, nor of serving as intermediary between the client/server module 16 and personal electronic devices. Only the client/server module 16 can respond to the connection requests and to the requests emanating from personal electronic devices. In this embodiment, the IFED 12 transmits the video streams to the client/server module 16 during the aircraft cruising phase or during the aircraft stopping phase, upon the arrival of the aircraft at its destination. Upon the arrival of the aircraft at its destination, during step 51, a personal electronic device, for example a personal electronic device 15C or 15D of passengers of the aircraft, dispatches a connection request to the client/server module 16, for example through the intermediary of a wireless connection such as a Wi-Fi connection available in an airport corresponding to the destination. When the connection is authorized, during step 52, the passenger using the personal electronic device 15C or 15D, defines characteristics of the image data of video streams that he desires to save. These characteristics are put into the form of a save item. During step 53, the save item is inserted into a request and transmitted to the client/server module 16. During step 54, the personal electronic device (15C or 15D) that transmitted the request receives image data corresponding to the save item transmitted in the request and saves these image data.

In one embodiment, during step 54, the personal electronic device (15C or 15D) that transmitted the request receives a URL address pointing to image data corresponding to the save item transmitted in the request and saves this address. As seen above, the personal electronic device (15C or 15D) can also receive the image data for direct display of these image data on the personal electronic device (15C or 15D). In this case, to avoid saturating the storage device 152, the personal electronic device does not save the displayed image data. If the passenger possessing the personal electronic device (15C or 15D) desires to view the image data again, he can download the image data at any moment subsequent to the receipt of the URL address.

On its side, the client/server module 16 receives the connection request during step 61. During step 61, a connection authorization is then transmitted by the client/server module 16 directly to the personal electronic device that sent the request. During step 63, the client/server module 16 undertakes the analysis of the save item contained in the request received during step 62. During step 64, the client/server module 16 transmits image data corresponding to the save item directly to the personal electronic device that sent the request.

In one embodiment, during step 64, the client/server module 16 transmits a URL address pointing to image data corresponding to the save item to the personal electronic device (15C or 15D) that sent the request and preserves the image data corresponding to the request in the storage device 22. As seen above, the client/server module 16 can also transmit the image data to the personal electronic device (15C or 15D) so that these image data are displayed directly without being saved. The client/server device 16 is available to respond to any request of the personal electronic device (15C or 15D) containing the URL address and to transmit the corresponding image data.

While at least one exemplary embodiment of the present invention(s) has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present disclosure(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system allowing saving, on a storage device, under control of a personal electronic device of a passenger of a vehicle, of image data of a video stream arising from a camera of the vehicle oriented towards an exterior of the vehicle, the system comprising an entertainment device onboard the vehicle configured to receive the video stream during a cruising phase, the system comprising:
    a first client/server module configured to receive and retransmit image data of the video stream received by the entertainment device to the storage device, the first client/server module comprising:
        a processor configured to connect the personal electronic device to the first client/server module;
        a receiver for receiving a request originating from the personal electronic device, the request comprising a save item, the save item being representative of a set of exterior images of the video stream arising from the camera of the vehicle to be saved on the storage device; and
        a transmitter for transmitting, to the storage device, image data of the video stream corresponding to the save item, causing the storage device to save the image data;
    the storage device being connected to the first client/server module and the transmitter, furthermore wherein the storage device is remote from the personal electronic device and the first client/server module is configured for transmitting, to the personal electronic device, a save address from which the personal electronic device can download the image data corresponding to the save item;
        wherein the vehicle is an aircraft, wherein the personal electronic device is configured to display a graphical interface comprising a plurality of menus allowing the passenger to specify a plurality of characteristics of the set of exterior images of the video stream to be saved, and wherein the aircraft comprises a plurality of exterior cameras and the save item specifies the camera, from among the plurality of exterior cameras, for the video stream to be saved on the storage device.

2. The system according to claim 1, wherein the first client/server module is included in the entertainment device.

3. The system according to claim 1, wherein the first client/server module is a geographically fixed device, configured to communicate with a second client/server module, included in the entertainment device, during a cruising phase of the vehicle or during a stopping phase of the vehicle, the second client/server module allowing the entertainment device to receive the video stream and to retransmit the video stream to the first client/server module.

4. The system according to claim 1, wherein the save item comprises an item making it possible to identify the camera that acquired the video stream from among a plurality of cameras of the vehicle and/or an item representative of metadata to be associated with the set of images and/or an item representative of a desired image size and/or an item representative of a desired image coding format and/or an item representative of a desired image compression rate and/or an item representative of at least one period, designated a recording period, of the video stream to be recorded and/or an item representative of a number of images to be saved per second and/or an item representative of at least one type of image from among images of INTRA and/or INTER and/or Bidirectional type and/or key images corresponding to a change of scene in the video stream.

5. A method of saving, using a system according to claim 1, image data of a video stream on a storage device, under control of a personal electronic device of a passenger of a vehicle, the video stream arising from a camera of the vehicle, wherein the method comprises a loading procedure comprising the following steps implemented by the personal electronic device:
    transmitting a connection request to the first client/server module; and
    dispatching a request to the first client/server module comprising an item, designated a save item, representative of a set of images of the video stream to be saved so as to cause a save of the image data of the video stream corresponding to the save item on the storage device.

6. The method as claimed in claim 5, wherein, during the loading procedure, the image data corresponding to the save item are transmitted to the personal electronic device, by the first client/server module, immediately upon receipt of the image data by the first client/server module or after prior storage of the image data on the storage device.

7. A method of saving image data of a video stream on a storage device under control of a personal electronic device of a passenger of a vehicle, the video stream arising from a camera of the vehicle oriented towards an exterior of the vehicle, the method comprising:
    providing a system allowing saving, on a storage device, under control of a personal electronic device of a passenger of a vehicle, of image data of a video stream arising from a camera of the vehicle, the system comprising an entertainment device onboard the vehicle configured to receive the video stream during a cruising phase, the system comprising:
        a first client/server module configured to receive and retransmit image data of the video stream received by the entertainment device to the storage device, the first client/server module comprising:
            a processor configured to connect the personal electronic device to the first client/server module;
            a receiver; and
            a transmitter;
        the storage device being connected to the first client/server module and the transmitter, furthermore wherein the storage device is remote from the personal electronic device; and
    the method further comprising a transfer procedure comprising steps as follows implemented by the first client/server module:
        receiving a connection request from the personal electronic device;

receiving a request originating from the personal electronic device, the request comprising a save item, the save item being representative of a set of exterior images of the video stream arising from the camera of the vehicle to be saved on the storage device; and transmitting, to the storage device, image data of the video stream corresponding to the save item, causing the storage device to save the image data; and transmitting, to the personal electronic device, a save address from which the personal electronic device can download the image data corresponding to the save item;

wherein the vehicle is an aircraft, wherein the personal electronic device is configured to display a graphical interface comprising a plurality of menus allowing the passenger to specify a plurality of characteristics of the set of exterior images of the video stream to be saved, and wherein the aircraft comprises a plurality of exterior cameras and the save item specifies the camera, from among the plurality of exterior cameras, for the video stream to be saved on the storage device.

8. The method according to claim 7, wherein, subsequent to the receipt of the request, the first client/server module analyzes the save item and applies a processing to the video stream so as to provide image data compatible with the save item.

9. The method according to claim 7, wherein the first client/server module authorizes connection exclusively during a cruising phase of the vehicle or exclusively during a stopping phase of the vehicle.

10. The method according to claim 7, wherein, when the first client/server module is a geographically fixed device, the second client/server module transmits the video stream to the first client/server module during a cruising phase of the vehicle or during a stopping phase of the vehicle.

* * * * *